United States Patent
Myers et al.

(10) Patent No.: US 7,621,003 B2
(45) Date of Patent: Nov. 24, 2009

(54) SELF-LOCKING SWIVEL CASTOR WHEELS FOR ROLL-IN COT

(75) Inventors: Dean E. Myers, Washington Courthouse, OH (US); Eugene Van Dyne, Wilmington, OH (US); William H. Benedict, Jamestown, OH (US); Gavin Broadley, Coolum Beach (AU); Alan Cambridge, Wooloowin (AU)

(73) Assignee: Ferno-Washington, Inc., Wilmington, OH (US)

( * ) Notice: Subject to any disclaimer, the term of this patent is extended or adjusted under 35 U.S.C. 154(b) by 0 days.

(21) Appl. No.: 11/578,010

(22) PCT Filed: Mar. 14, 2005

(86) PCT No.: PCT/US2005/008546

§ 371 (c)(1),
(2), (4) Date: May 8, 2008

(87) PCT Pub. No.: WO2005/105480

PCT Pub. Date: Nov. 10, 2005

(65) Prior Publication Data

US 2009/0000034 A1 Jan. 1, 2009

Related U.S. Application Data

(60) Provisional application No. 60/562,504, filed on Apr. 15, 2004.

(51) Int. Cl.
*A61G 1/02* (2006.01)

(52) U.S. Cl. .................. 5/86.1; 5/611; 296/20; 16/35 R

(58) Field of Classification Search .............. 5/611, 5/86.1, 620, 600; 296/20; 16/35 R
See application file for complete search history.

(56) References Cited

U.S. PATENT DOCUMENTS

| 3,409,105 | A | * | 11/1968 | Clinton ................. 188/29 |
| 4,309,791 | A | * | 1/1982 | Aulik ................ 16/35 R |
| 4,349,938 | A | * | 9/1982 | Fontana ............... 16/35 R |
| 4,998,320 | A | * | 3/1991 | Lange ................. 16/35 R |
| 5,014,391 | A | * | 5/1991 | Schulte ............... 16/35 R |
| 5,303,450 | A | * | 4/1994 | Lange ................. 16/35 D |
| 5,899,469 | A | * | 5/1999 | Pinto et al. ........... 280/79.11 |
| 6,353,948 | B1 | * | 3/2002 | Bolden et al. .......... 5/600 |
| 6,735,794 | B1 | * | 5/2004 | Way et al. ............ 5/86.1 |

* cited by examiner

*Primary Examiner*—Alexander Grosz
(74) *Attorney, Agent, or Firm*—Dinsmore & Shohl LLP

(57) ABSTRACT

A roll-in cot (1) having a patient support attached to a wheeled transporter wherein the wheeled transporter comprises leading (3) and trailing (4) collapsible legs having respective proximal ends pivotally connected to a frame (2) and distal ends including swivel castor wheels (18A, 18B) wherein at least the swivel castors (18A) of the leading collapsible legs (3) are operable in either a swivel or lock mode, and wherein the swivel mode is only operable by a castor release mechanism (22) while the cot (1) is in a fully upright position.

9 Claims, 6 Drawing Sheets

SELF-LOCKING SWIVEL CASTOR WHEELS FOR ROLL-IN COT

The present invention relates to emergency cots, such as of the type used to transport patients. In particular, the present invention relates to roll-in cots having collapsible legs, of the type used in emergency vehicles such as ambulances, with self-locking swivel castor wheels.

Emergency cots of the roll-in type are used to support a patient on a stretcher, the stretcher being mounted on a wheeled undercarriage or transporter. A patient may be maneuvred on an emergency cot by a single operator at the trailing end or maybe maneuvred with the assistance of other operators on the wheeled transporter.

Emergency cots of the roll-in type are configured to be able to be rolled into various types of rescue vehicles, such as ambulances, vans, station wagons, modular type rescue vehicles, aircrafts, helicopters and the like. In order to be able to roll an emergency cot into such a vehicle, the cot generally is configured to support the stretcher at a similar height to that of the platform in the emergency vehicle upon which the patient is to be transported. The undercarriage or transporter collapses to be beneath the stretcher and is supported on the platform.

Emergency cots of the roll-in type are typically provided with swivel castor wheels at the lower end of the support structure to improve mobility of the cot. Typically, the front or leading pair of wheels are locking swivel castors which permits the stretcher to move in its non-longitudinal direction when unlocked and in its longitudinal direction when locked. The locked position is typically engaged when loading the cot into an emergency vehicle.

Typically, a swivel blocking pin is mounted outside the leg. The blocking pin engages the castor to selectively prevent swivelling of the castor about the leg. However, to prevent swivelling of the castor, often it is necessary to align the position of the castor relative to the blocking pin, in order to manually engage the block pin with the castor. This adds an extra step during insertion of this stretcher into an emergency vehicle, which may be overlooked during an emergency situation.

Prior art devices have attempted to solve this problem by providing a castor lock control assembly that operates the blocking pin via a cable, which allows medical personnel to remotely select the operating mode of the castors. Such a device is disclosed by U.S. Pat. No. 6,735,794. In this published application, the control assembly locks the castors in either a swivel state or in a fixed orientation through the turning of a barrel switch provided on each side of the stretcher. Consequently, when loading a cot having such a castor lock control assembly into the back of the ambulance, if the technicians forget to turn one of the barrel switches to the locked position, when unloading the cot, such non-longitudinal movement of the pair of swivel castors upon contact with the ground could tip the cot. Accordingly, there is a need for improvements in cots having collapsible legs, of the type used in emergency vehicles such as ambulances, with locking swivel castor wheels.

The present invention provides an emergency cot that enables simplified operation of the locking swivel castors wheels of the leading collapsible legs which overcomes or ameliorates one or more of the disadvantages described above, or which at least provides the consumer with a useful or commercial choice.

In the first broad form of the present invention there is provided a roll-in cot having a patient support attached to a wheeled transporter wherein the wheeled transporter comprises leading and trailing collapsible legs having respective proximal ends pivotally connected to a frame and distal ends including swivel castor wheels to easily steer the stretcher. The swivel castors at the leading end of the stretcher are also lockable and operate in either a swivel mode or a fixed mode. The swivel mode allows the locking swivel castors to swivel 360 degrees around their respective leading leg. The fixed mode is self actuating and fixes the swivel castors of the leading collapsible legs in line with the longitudinal direction of the cot so that the roll-in cot may be pushed in a straight line.

The present invention provides a castor release assembly that allows medical personnel to easily select the swivel mode of the castors. The castor release assembly is accessible from the leading end of the cot and releases the leading castors from the fixed mode. Consequently, personnel need to locate at or adjacent the leading end of the cot to actuate the castor release assembly.

Medical personnel actuate the release assembly by grasping firmly an included hand operated lever. With the lever actuated, the release assembly maintains the castors in the swivel mode. Releasing the lever, such as when loading a person into an emergency vehicle, places the cot in the fixed mode. In the fixed mode, any forward motion of the cot will cause the castors to rotate about their respective legs and once longitudinally aligned, the release assembly will automatically and positively lock the leading castors in the loading direction. This prevents medical personnel from unintentionally forgetting to lock the castors when loading the cot into an emergency vehicle. The hand operated lever only operates to place the cot in the swivel mode when the cot is in its fully elevated position. This prevents accidental operation of the swivel lock mechanism with the cot in a lower or lowest position, such as when loading or unloading the cot from the emergency vehicle.

In order that the invention may be more fully understood and put into practice, the various embodiments of the invention will now be described with reference to the accompanying drawings.

The following detailed description of the preferred embodiments of the present invention can be best understood when read in conjunction with the following drawings, where like structure is indicated with like reference numerals, and in which.

Figure 1:
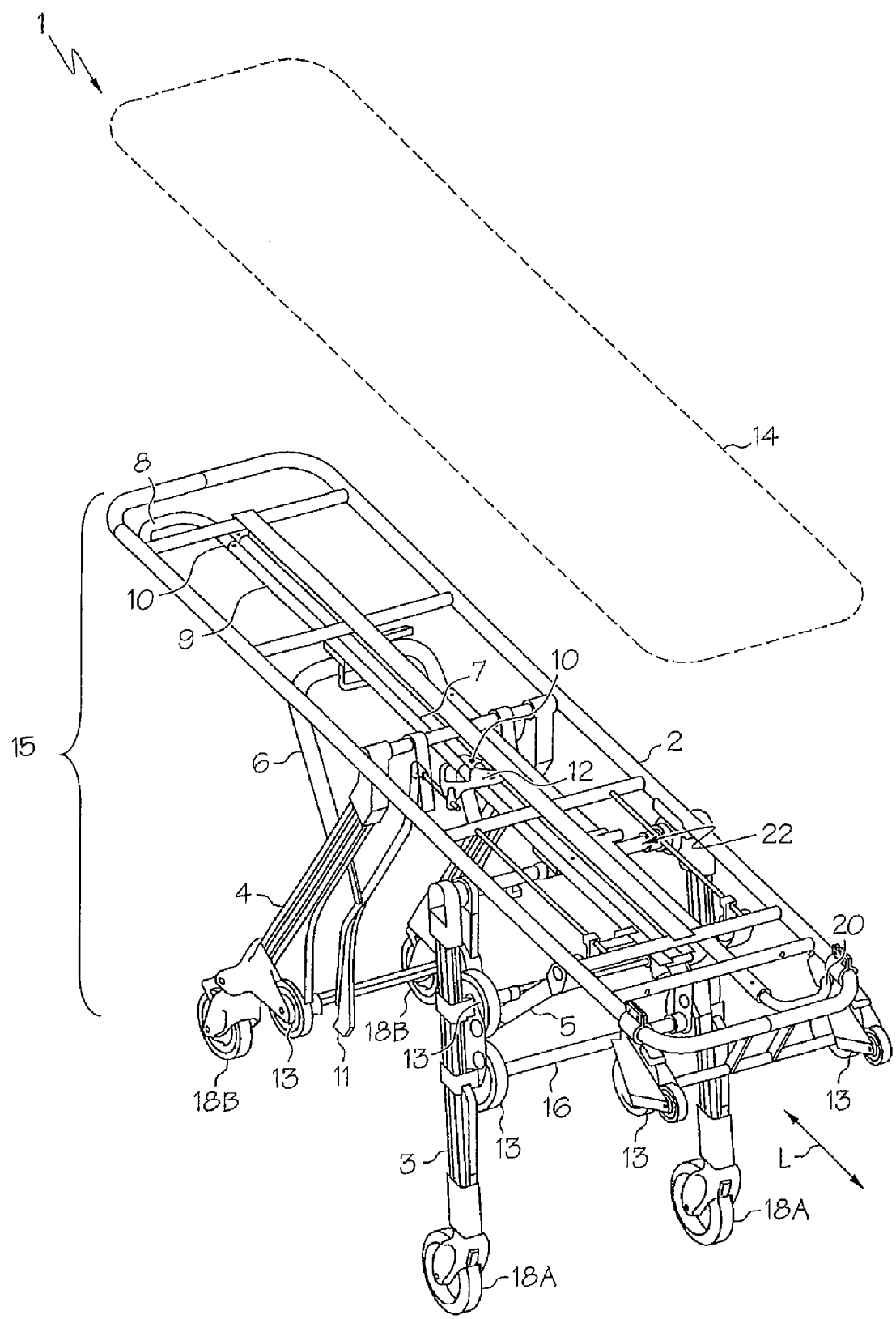
FIG. 1 is an elevated perspective view of a roll-in cot according to one embodiment of the present invention in a fully extended position.
Figure 2A:
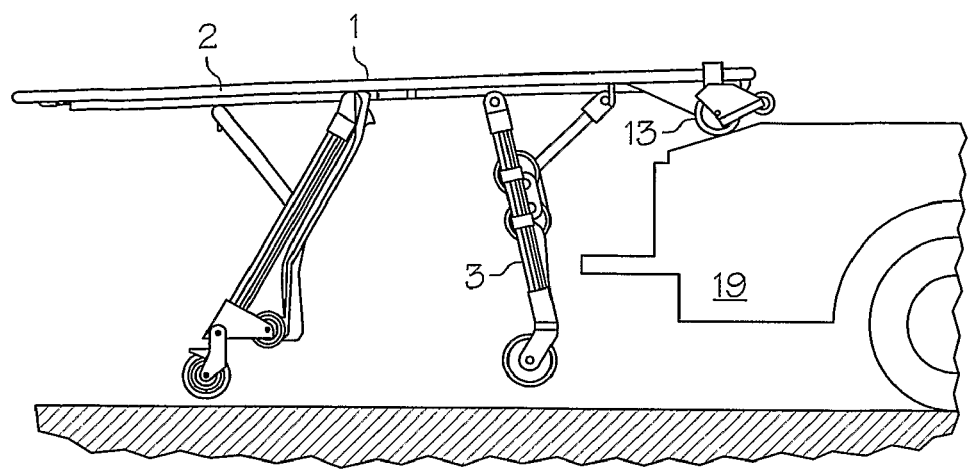
FIG. 2a is a side view of the roll-in cot of FIG. 1 in a position prior to being fully loaded into an emergency vehicle.
Figure 3A:
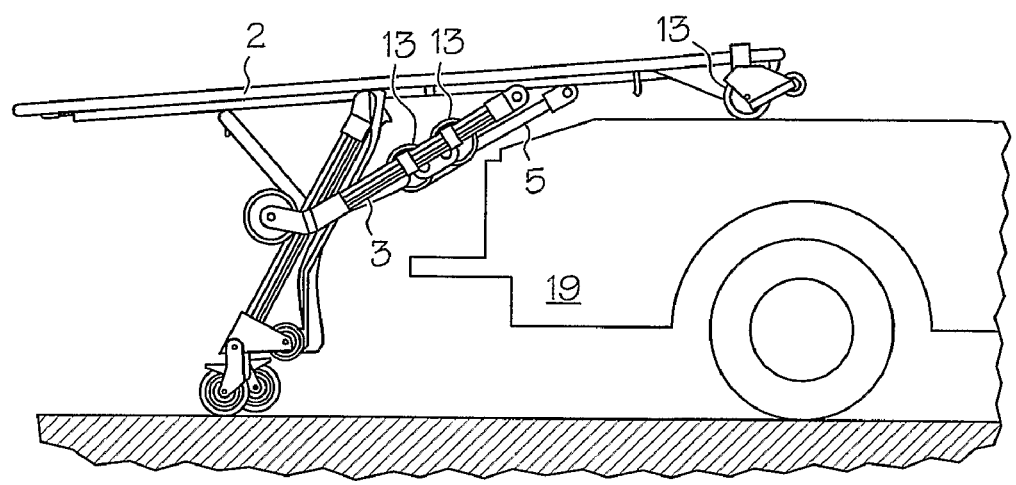
FIG. 3a is a side view of the roll-in cot of FIG. 1 in a partially loaded position situated on an emergency vehicle.
Figure 3B:
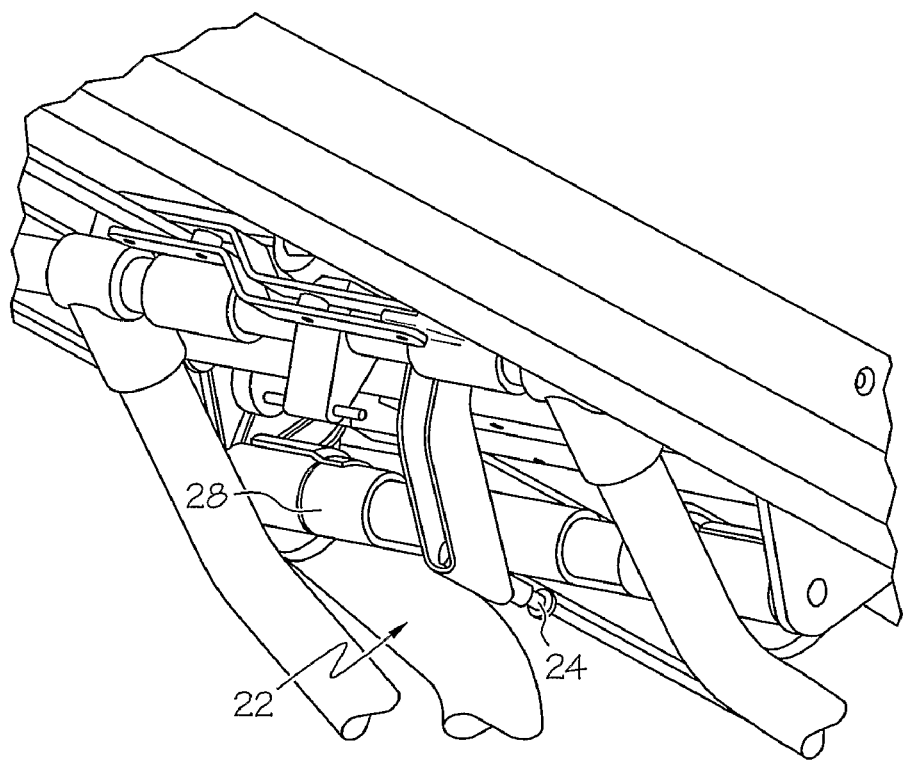
FIG. 3b is a bottom perspective section view of the roll-in cot of FIG. 3a showing the position of a castor release assembly in a non-operable position.
Figure 4:
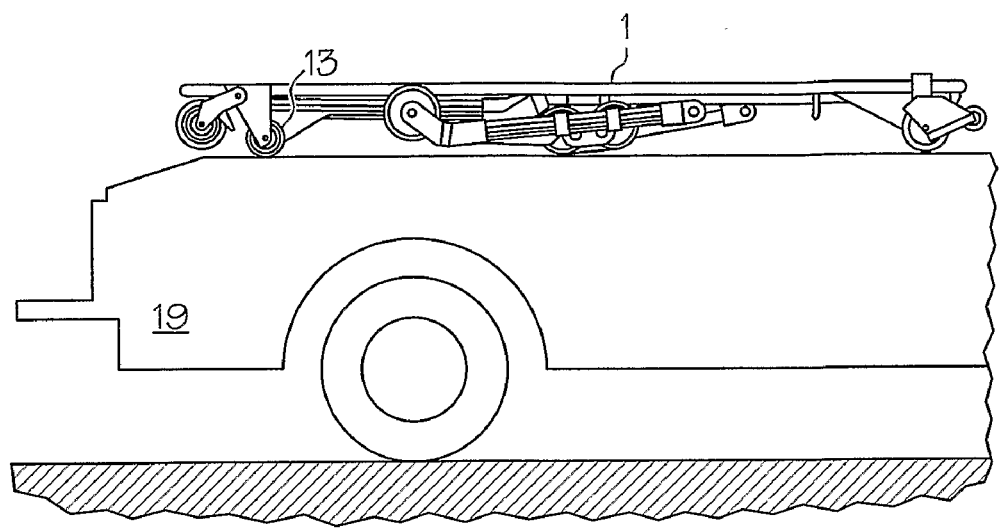
FIG. 4 is a side view of the roll-in cot of FIG. 1 in a fully loaded position situated on an emergency vehicle.

FIG. 1 shows a roll-in cot, generally indicated as symbol 1, which is formed from a frame 2 on which are pivotally mounted a leading pair of collapsible legs 3 and a trailing pair of collapsible legs 4. For purposes of this disclosure, the left end of the roll-in cot 1 illustrated in FIGS. 2a, 3a, and 4 is deemed to be the trailing end and the right end of cot is deemed to be the loading end. Movement of the roll-in cot 1 to the right is a forward movement; movement to the left, rearward movement.

In the fully elevated condition shown, the roll-in cot 1 is supported on the leading pair of collapsible legs 3 and trailing pair of collapsible legs 4. The leading and trailing collapsible legs 3 and 4, respectively, are typically each in the form of a pair of legs, one-by-one on either side of the frame 2 so as to provide stability to the loaded cot 1. In one embodiment, the pair of leading legs 3 is spaced apart by a greater or lesser distance than the trailing pair of legs 4 such that in a collapsed state the respective pairs of legs can collapse into a nested configuration. An alternative configuration employs a single leading leg and/or a single trailing leg, each spaced apart wheels at the distal ends thereof. In the illustrated embodiment, the respective pairs of collapsible legs 3 and 4 are also splayed, i.e. that the leading pair of collapsible legs is angled forward and the trailing pair of collapsible legs is angled backwards. However, in an alternative embodiment, vertical legs may be used.

The leading pair of collapsible legs 3 is locked into position by a support strut 5 that is locked to the frame 2. The trailing pair of collapsible legs is locked in position by a support strut 6 locked to the frame 2. In the locked condition, the pairs of legs 3 and 4 are retained in an erect condition and by either deactivating a leg release or a safety will not cause the legs to collapse.

To collapse the pairs of legs 3 and 4, a release assembly 7 is operated by a handle 8 that actuates a bar 9 by moving the bar 9 rearwardly relative to the roll-in cot 1. On operation of the handle 8 so as to move the bar 9 in a rearward direction, the bar 9 is displaced laterally by arms 10 that are pivotally mounted to both the frame and to bar 9. The release assembly 7 also includes a touch bar 11 for engagement with the rear of a platform, such as on an emergency vehicle 19 (FIG. 2a). Actuation of touch bar 11 causes a cam 12 to be rotated on the frame 2. Rotation of the cam 12 on frame 2 allows the bar 9 to move further in a lateral direction, thereby permitting the collapse of the trailing pair of legs 4. A similar leg release and safety mechanism may be provided on the leading pair of legs 3. The mechanics and operation of the touch bar 11 is disclosed by commonly owned U.S. Pat. No. 7,424,758, which is herein incorporated fully by reference.

The frame 2 further includes loading wheels 13 which are also provided on the leading space of the leading pair of collapsible legs 3 and the trailing pair of collapsible legs 4. The roll in cot 1 also includes a patient support 14, which is removed from the wheeled transporter 15 for the sake of clarity. The patient support 14 used in the roll-in cot of the present invention may be in any convenient form. Suitably, the patient support 14 may be in the form of a stretcher.

However, it will be appreciated that other patient support configurations may be used such as chairs or the like. In one embodiment, the patient support 14 is in the form of a segmented stretcher whereby respective segments may be contoured to provide improved support for the patient. The patient support 14 in another embodiment is removably attached to the wheeled transporter 15. The patient support 14 in still another embodiment is a detachable stretcher that may be reversibly attached to the frame of the wheeled transporter 15. In another embodiment, the patient support 14 is permanently affixed to the wheeled transporter 15.

The wheeled transporter 15 may be of any convenient configuration and may preferably be adjustable in height such that the roll-in cot may be readily loaded into an emergency vehicle. The frame 2 may also include provision for the attachment of medical appliances thereto that may be associated with patient transport. For example, the frame 2 may include a receptacle or docking port for holding an oxygen cylinder, heart monitoring equipment, IV poles, and the like.

In one embodiment, the respective pairs of collapsible legs 3 and 4 are provided with bracing members 16 and 17 that extend there between to stabilize the respective pairs of collapsible legs. Additionally, swivel castor wheels 18a and 18b are also provided at the distal ends of each leg.

The swivel castors 18a at the leading end of the roll-in cot 1 are also lockable and operate in either a swivel mode or a fixed mode. The swivel mode allows the locking swivel castors 18a to swivel 360 degrees around their respective leading leg. The fixed mode is self actuating and fixes the locking swivel castors 18a of the leading collapsible legs in line with the longitudinal direction of the cot so that the roll-in cot 1 may be pushed easily in a straight line.

It is to be appreciated that the present invention provides the roll-in cot 1 with a simplified operation of locking the swivel castor wheels 18a of the leading collapsible legs 3. Medical personnel easily select the swivel mode by operating a hand operated lever 20 of a castor release assembly 22 (which is best shown by FIGS. 2b, 3b, and 6a and 6b). The hand operated lever 20 is accessible from the leading end of the cot 1 and is used to release the leading castors 18a from the fixed mode. Consequently, personnel need to locate at or adjacent the leading end of the cot 1 to actuate the castor release assembly 22.

Figure 2B:
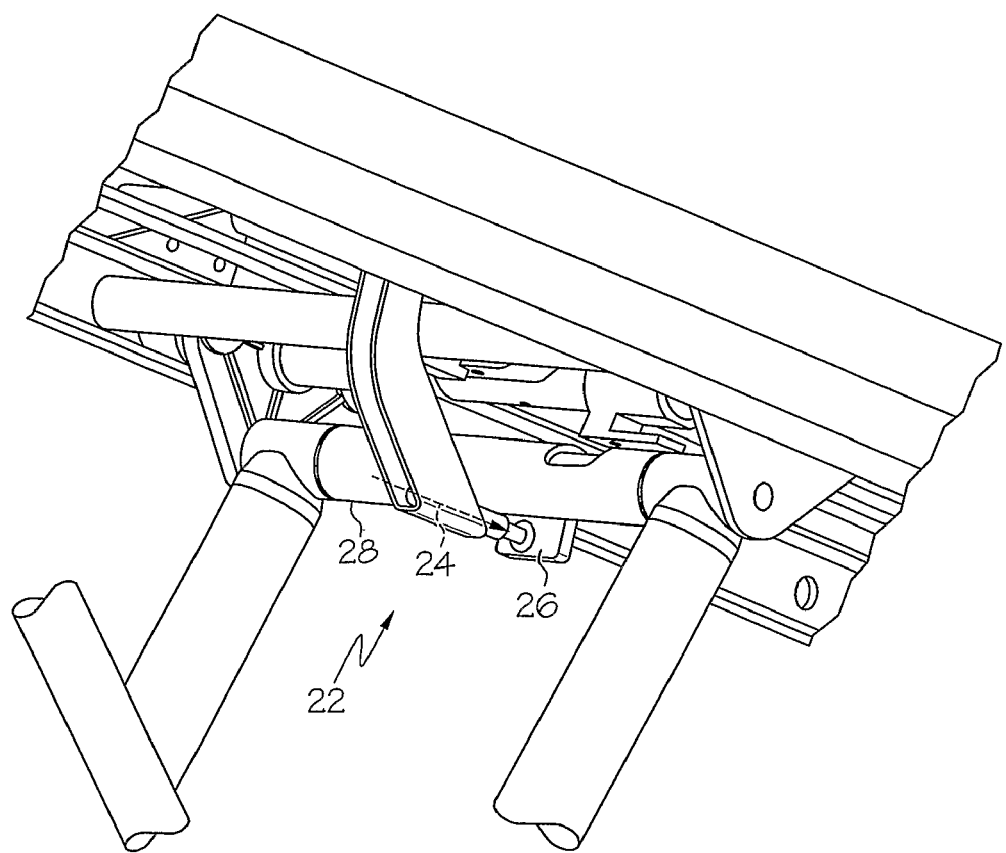
FIG. 2b is a bottom perspective section view of the roll-in cot of FIG. 2a showing the position of a castor release assembly in an operable position.
Figure 5:
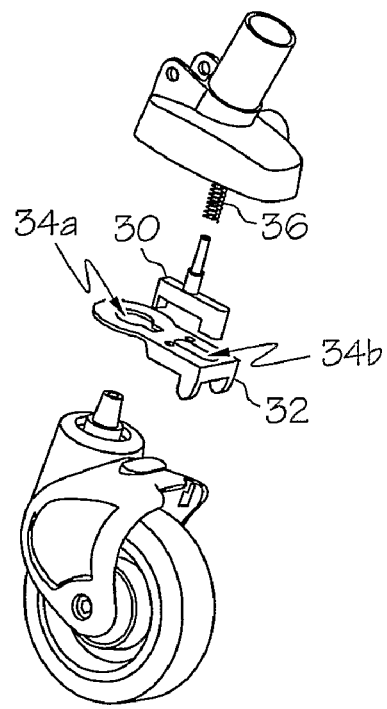
FIG. 5 is an exploded view of a portion of the castor release assembly according to the present invention.
Figure 6A:
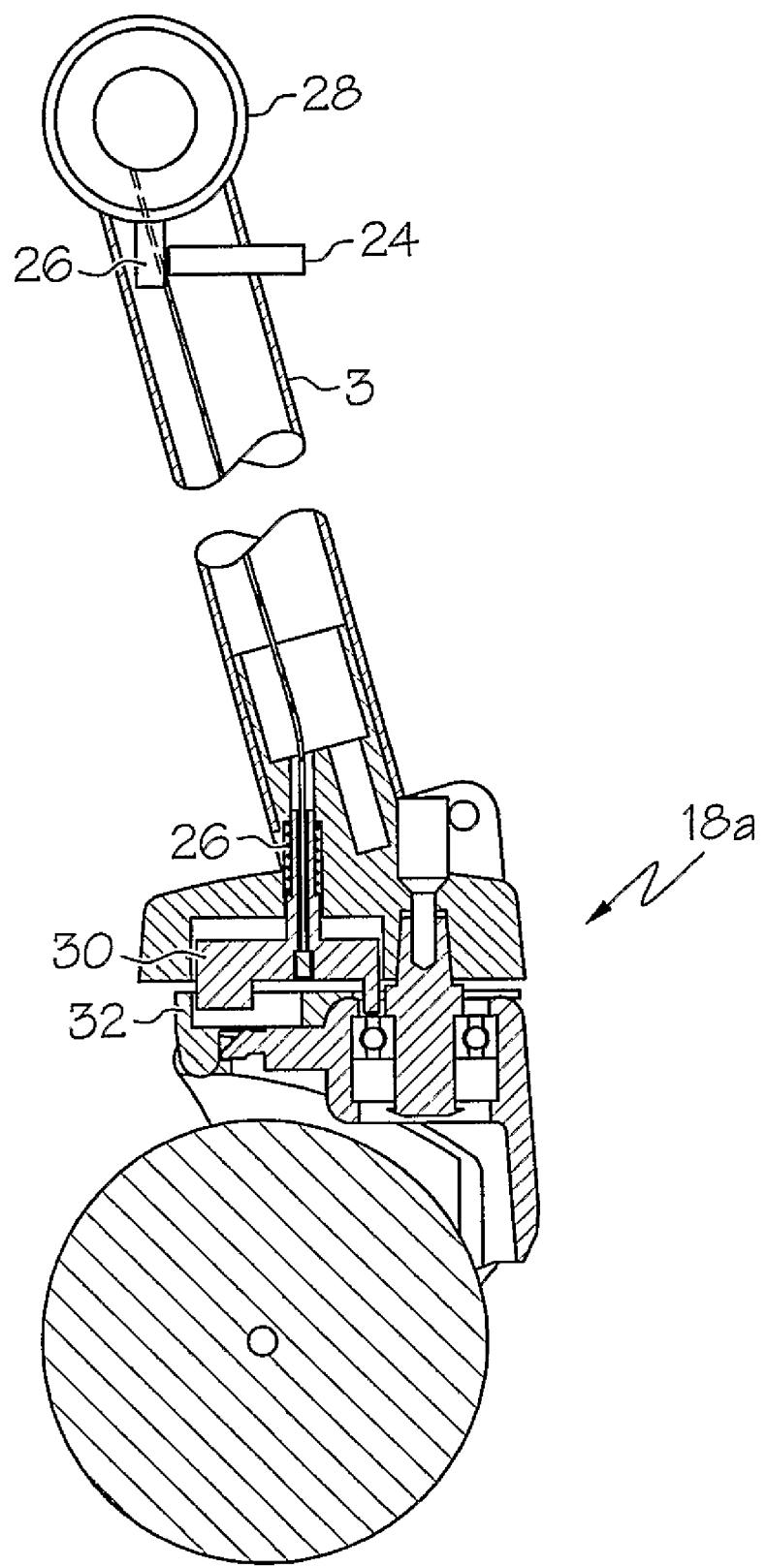
FIG. 6a is a first enlarged partial section view of the castor release assembly according to the present invention showing an actuator positioned relative to a release bar with the roll-in cot in the fully extended position, which is the only position in which the release bar can be engaged by the actuator.
Figure 6B:
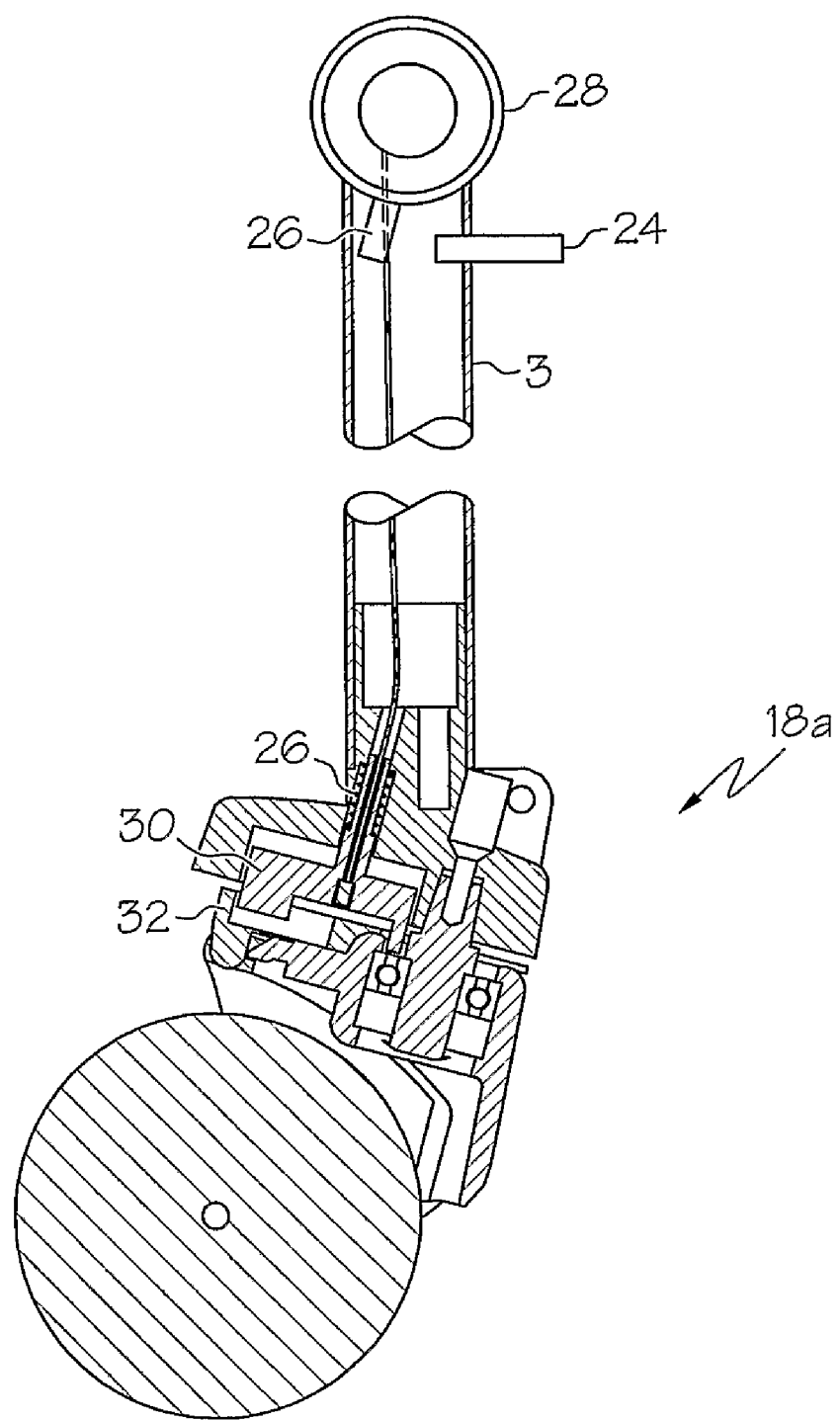
FIG. 6b is a second enlarged partial section view of the castor release assembly according to the present invention, wherein as the loading legs of the cot transition underneath the cot to the fully loaded position, the release bar rotates away from the actuator such that the castor release assembly is nonoperable while the roll-in cot is transitioning to and in the loaded position.

Medical personnel actuate the castor release assembly 22 by clenching firmly the hand operated lever 20. It is to be appreciated that squeezing lever 20 will transition an actuator 24 into a strike plate 26 of a release bar 28 of the castor release assembly 22, as shown by FIG. 2b. Moving the strike plate 26, rotates the release bar 28 which clears an interference between a pin 30 and a rest plate 32 of each locking swivel castor 18a, as best shown by FIGS. 5 and 6a. So long as the lever 20 is activated, the release assembly 22 maintains the castors in the swivel mode. Releasing the lever 20, such as when loading a person into an emergency vehicle as illustrated by FIGS. 2a, 2b, and 4, places the cot in the fixed mode. In the fixed mode, any forward motion of the cot will cause the locking swivel castors 18a to rotate about their respective legs and once longitudinally aligned, the release assembly will automatically and positively lock the leading castors in the loading direction.

As best shown by FIG. 5, as the castor 18a rotates about its respective leg, with the lever 20 released, pin 30 will reseat into cavities 34a and 34b provided in the resting plate 32 due to the biasing force provided by spring 36. The cavities 34a and 34b of the resting plate 32 are arranged to situate the castor wheel 18a in a relative position such that the cot can be rolled in a straight line.

It is to be appreciated that the hand operated lever 20 only operates to place the cot 1 in the swivel mode when the cot is in its fully elevated position. As illustrated by FIGS. 2*b*, 3*b*, 6*a* and 6*b*, as the lead pair of legs transition rearward, such as when the cot is being rolled onto the emergency vehicle 19 as illustrated by FIG. 3*a*, wherein as the legs of the cot transition underneath the cot towards the fully loaded position, the strike plate 26 of the release bar 28 rotates away from the actuator 24. In this manner, as soon as the legs 3 are transitioned from the fully upright position, the actuator 24 and strike plate 26 separate such that the castor release assembly 22 is nonoperable while the roll-in cot is transitioning into the loading position. Operating the lever 20 accordingly will have no effect. This prevents accidental operation and release of the locking swivel castors with the cot 1 in a lower or lowest position, such as when loading or unloading the cot from the emergency vehicle.

Having described the invention in detail and by reference to preferred embodiments thereof, it will be apparent that modifications and variations are possible without departing from the scope of the invention defined in the appended claims.

The invention claimed is:

1. A roll-in cot having a patient support attached to a wheeled transporter wherein the wheeled transporter comprises leading and trailing collapsible legs having respective proximal ends pivotally connected to a frame and distal ends including wheels, wherein at least at the leading end of the cot the wheels are swivel castor wheels which are lockable and operable in either a swivel mode or a fixed mode, wherein the swivel mode allows each of the swivel castor wheels to swivel 360 degrees around their respective leading collapsible leg, and the fixed mode is self actuating and fixes the swivel castor wheels of the leading collapsible legs in line with a longitudinal direction of the cot so that the cot may be pushed in a straight line, and a castor release assembly for selecting the swivel mode of the swivel castor wheels, wherein the castor release assembly only operates to place the swivel castor wheels in the swivel mode when the cot is in a fully elevated position.

2. The roll-in cot of claim 1, further includes a level for selecting the swivel mode.

3. The roll-in cot of claim 2, wherein the castor release assembly is adapted to maintain the swivel castor wheels in the swivel mode so long as the lever is operated.

4. The roll-in cot of claim 2, wherein releasing the lever from an actuated position automatically places the cot in the fixed mode.

5. The roll-in cot of claim 2, wherein the level is accessible from the leading end of the cot.

6. The roll-in cot of claim 1, wherein when in the fixed mode, any forward motion of the cot will cause the swivel castor wheels of the leading legs to rotate about their respective legs and once longitudinally aligned, the castor release assembly will automatically and positively lock each of the swivel castor wheels in line with the longitudinal direction of the cot.

7. The roll-in cot of claim 1, wherein the castor release assembly includes pins which each engage a rest plate of a respective one of the swivel castor wheels when the cot is in the fixed mode, wherein when the cot is in the swivel mode, an interference between the pins and each rest plate is cleared.

8. The roll-in cot of claim 1, wherein the wheels of the trailing collapsible legs are swivel castor wheels.

9. A roll-in cot having a patient support attached to a wheeled transporter comprising:

a longitudinally extending frame;

leading and trailing collapsible legs having respective proximal ends pivotally connected to the frame;

wheels provided to distal ends of the trailing collapsible legs;

swivel castor wheels provided to distal ends of the leading collapsible legs which are lockable and operable in either a swivel mode or a fixed mode, wherein the swivel mode allows each of the swivel castor wheels to swivel 360 degrees around their respective leading collapsible leg, and the fixed mode is self actuating and fixes the swivel castor wheels of the leading collapsible legs in line with the longitudinally extending frame so that the cot may be pushed in a straight line; and a castor release assembly having a lever, an actuator connected to the lever, a strike plate, a release bar connected to the strike plate, and pins connected to the release bar, wherein the pins each engage a rest plate of a respective one of the swivel castor wheels when the cot is in the fixed mode, and wherein the castor release assembly is configured such that operating the lever only when the cot is in a fully elevated position selects the swivel mode via the actuator transiting into the strike plate which rotates the release bars and clears an interference between the pins and each rest plate.

\* \* \* \* \*